United States Patent [19]
Yang

[11] Patent Number: 6,162,058
[45] Date of Patent: Dec. 19, 2000

[54] MOTION BASE DEVICE FOR SIMULATORS

[75] Inventor: Gi Chool Yang, Incheon-si, Rep. of Korea

[73] Assignee: Kumyang Co., Ltd., Punsan-si, Rep. of Korea

[21] Appl. No.: 09/181,333

[22] Filed: Oct. 28, 1998

[30] Foreign Application Priority Data

Feb. 3, 1998 [KR] Rep. of Korea ......................... 98-2878

[51] Int. Cl.[7] .............................. G09B 9/08; G09B 19/16
[52] U.S. Cl. ................................ 434/55; 434/29; 434/58; 472/59; 472/130
[58] Field of Search ................................ 434/29, 30, 45, 434/51, 55, 58, 59, 62, 67, 365, 372; 472/1, 29, 59, 60, 61, 130, 131

[56] References Cited

U.S. PATENT DOCUMENTS

| | | | |
|---|---|---|---|
| 5,623,878 | 4/1997 | Baxter et al. | 104/85 |
| 5,752,834 | 5/1998 | Ling | 434/58 |
| 5,782,639 | 7/1998 | Beal | 434/29 |
| 6,077,078 | 6/2000 | Alet et al. | 434/55 |

*Primary Examiner*—Jacob K. Ackun
*Assistant Examiner*—Bena B. Miller
*Attorney, Agent, or Firm*—Shlesinger, Arkwright & Garvey LLP

[57] ABSTRACT

A motion base device for simulators is disclosed. In the motion base device, an upper plate is positioned above a base plate with a simulating cabin being carried on the upper plate. Three cylinder actuators are positioned between the base and upper plates so as to heave, pitch and/or roll the upper plate relative to the base plate. Of the three cylinder actuators being respectively placed at apexes of a regular triangle, the first one is fixedly mounted to the base plate and is jointed to the upper plate using a universal joint. Each of the second and third cylinder actuators is jointed to the base and upper plates using a universal joint and a joint block. A hydraulic pressure supply unit supplies pressurized oil to the three cylinder actuators so as to allow the three cylinder actuators to be independently operated.

10 Claims, 18 Drawing Sheets

MOTION BASE DEVICE FOR SIMULATORS

BACKGROUND OF THE INVENTION

1. Field of the Invention

The present invention relates, in general, to a motion base device for simulators, such as military practice simulators or game simulators, and more particularly, to a motion base device capable of giving real and active conditions to a simulator using three cylinder actuators and allowing users to practice in the simulator representing such real and active conditions.

2. Description of the Prior Art

As well known to those skilled in the art, a flight simulator, or equipment which represents real conditions in an aircraft and allows users to learn to fly, was initially invented as a poor mechanical system in the United States of America in 1930s. In the initial stages of 1950s, such a mechanical system of the simulators was changed into a computer-aided system in accordance with a development in electronic technologies and computers. In addition, the highly improved computer graphic technologies of the 1980s allow the computer-aided simulators to effectively give users real and active background images during practice in the simulators. Such computer-aided simulators, capable of providing real and active background images, have been thus effectively and widely used for learning to fly, sail or drive from the initial stages of the 1980s.

In recent years, the computer-aided simulators are more widely used in various industrial fields. That is, such simulators are also used for learning to operate a variety of construction equipment, such as cranes and excavators, or are used for entertainment applications.

In a brief description, the computer-aided simulators are effectively used as game simulators, military practice simulators, a variety of test simulators, automobile driving simulators, etc.

However, the typical hydraulic motion base device for such simulators is designed to have six-degrees-of-freedom. The motion base device, with such six-degrees-of-freedom, is very expensive. This prevents the simulators, with such a motion base device, from being generally used in industrial fields. Particularly, simulators for entertainment applications are rarely designed as one- or two-seaters due to such an expensive motion base device, but are mainly designed as multi-seaters.

Since it is almost impossible to effectively realize the interactive technologies between human beings and computers in such multi-seater simulators, there is a limit in realizing desired reality and activity in such entertainment simulators.

SUMMARY OF THE INVENTION

Accordingly, the present invention has been made keeping in mind the above problems occurring in the prior art, and an object of the present invention is to provide a motion base device for simulators, which uses three cylinder actuators positioned at apexes of a regular triangle and commonly jointed to a simulating cabin using universal joints, thus giving real and active conditions to simulators while simplifying the construction and reducing production cost of the simulators.

In order to accomplish the above object, the present invention a motion base device for simulators, comprising: a base plate; an upper plate positioned above the base plate while being spaced apart from the base plate with a simulating cabin being carried on the upper plate; first to third cylinder actuators vertically positioned between the base and upper plates so as to heave, pitch and/or roll the upper plate relative to the base plate, the first to third cylinder actuators being respectively placed at apexes of a triangle, the first cylinder actuator being mounted to the base plate at a lower end thereof and being jointed to the upper plate at an upper end thereof using universal jointing means, and each of the second and third cylinder actuators being jointed to the base and upper plates at lower and upper ends thereof using universal joint means; and a hydraulic pressure supply unit used for supplying pressurized oil to the three cylinder actuators so as to allow the three cylinder actuators to be independently operated.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
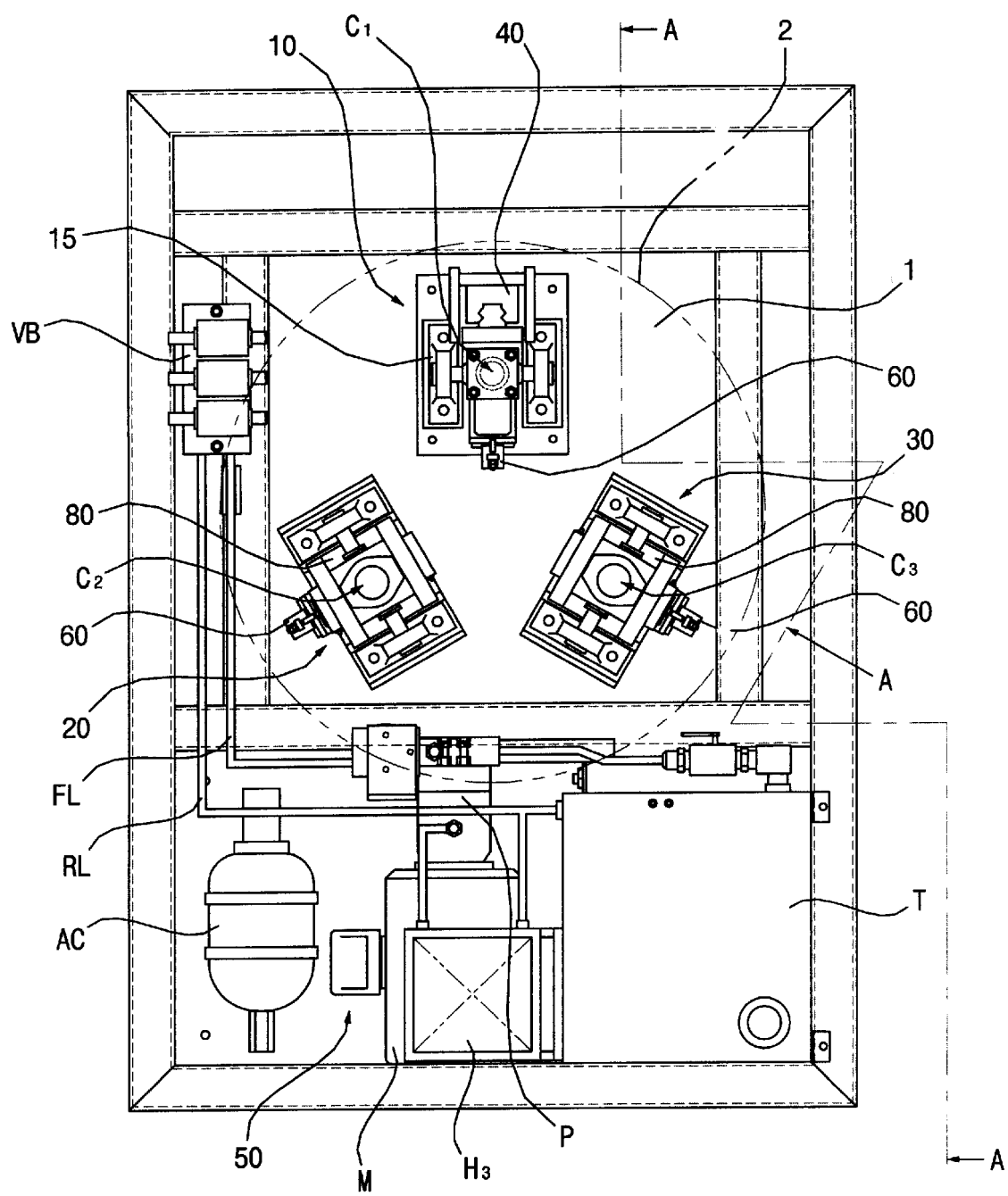
FIG. 1 is a plan view of the motion base device for simulators in accordance with the preferred embodiment of the present invention.
Figure 2:
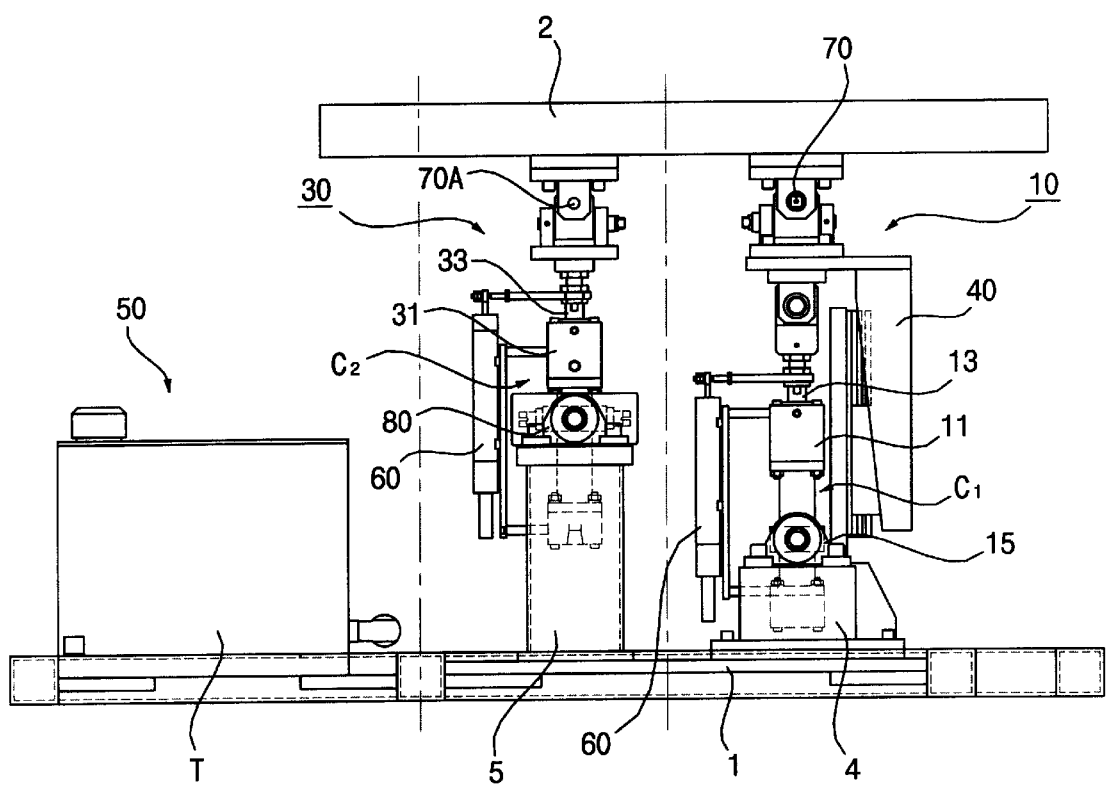
FIG. 2 is a side view of the motion base device of this invention taken along the line of A—A of FIG. 1.

FIG. 1 is a plan view of the motion base device for simulators in accordance with the preferred embodiment of this invention. FIG. 2 is a side view of the motion base device of this invention taken along the line of A-A of FIG. 1. As shown in the drawings, the motion base device of this invention comprises a base plate 1 positioned at the lower portion of the device. An upper plate 2, carrying a simulating cabin, is positioned above the base plate 1 while being spaced apart from said base plate 1. Three cylinder actuators $C_1$, $C_2$ and $C_3$ are vertically positioned between the two plates 1 and 2. Said cylinder actuators $C_1$, $C_2$ and $C_3$ are respectively placed at the apexes of an exact triangle and are independently and linearly operated by a hydraulic pressure supplied from a hydraulic pressure supply unit 50, thus heaving, pitching and/or rolling the upper plate 2.

Of the above three actuators $C_1$, $C_2$ and $C_3$, the first one $C_1$ is fixedly mounted to the base plate 1 and is jointed to the upper plate 2 through a first universal joint 70. Meanwhile, each of the second and third actuators $C_2$ and $C_3$ is jointed to said upper plate 2 through a second universal joint 70A and is jointed to the base plate 1 through a joint block 80.

The three actuators $C_1$, $C_2$ and $C_3$ individually comprise a double-acting cylinder actuator of which the piston rod 13, 23, 33 is coupled to the universal joint 70, 70A. The piston rods 13, 23 and 33 of the three actuators $C_1$, $C_2$ and $C_3$ independently and linearly move relative to the cylinders of said actuators in accordance with hydraulic pressures acting on the pistons of the actuators, thus heaving, pitching and/or rolling the upper plate 2.

That is, the first actuator $C_1$ is designed to heave the upper plate 2 up and down in a vertical direction. Meanwhile, the second and third actuators $C_2$ and $C_3$ are designed to heave, pitch and/or roll the upper plate 2 in accordance with a difference between the extended lengths of the piston rods 13, 23 and 33 of the three actuators $C_1$, $C_2$ and $C_3$.

In the device of this invention, the three actuators $C_1$, $C_2$ and $C_3$ form first to third hydraulic actuating units 10, 20 and 30 for the upper plate 2, respectively. Since the second and third actuating units 20 and 30 of the preferred embodiment have the same construction, the second actuating unit 20 is not shown in FIG. 2 for ease of drawing the figure.

A guide unit 40 is provided on the first actuating unit 10 and allows said actuating unit 10 to stably move in a vertical direction without being badly affected by a lateral force. In order to sense the variable heights of the cylinder actuators $C_1$ to $C_3$, each of the first to third actuating units 10, 20 and 30 is provided with a linear sensor 60.

The hydraulic pressure supply unit 50 is provided at a side of the area for the three cylinder actuators $C_1$, $C_2$ and $C_3$ and comprises an oil tank T, a hydraulic pump P, a fan cooler $H_3$, an accumulator AC, a valve block VB, a plurality of fluid supply lines FL, a plurality of return lines RL, etc.

Figure 3:
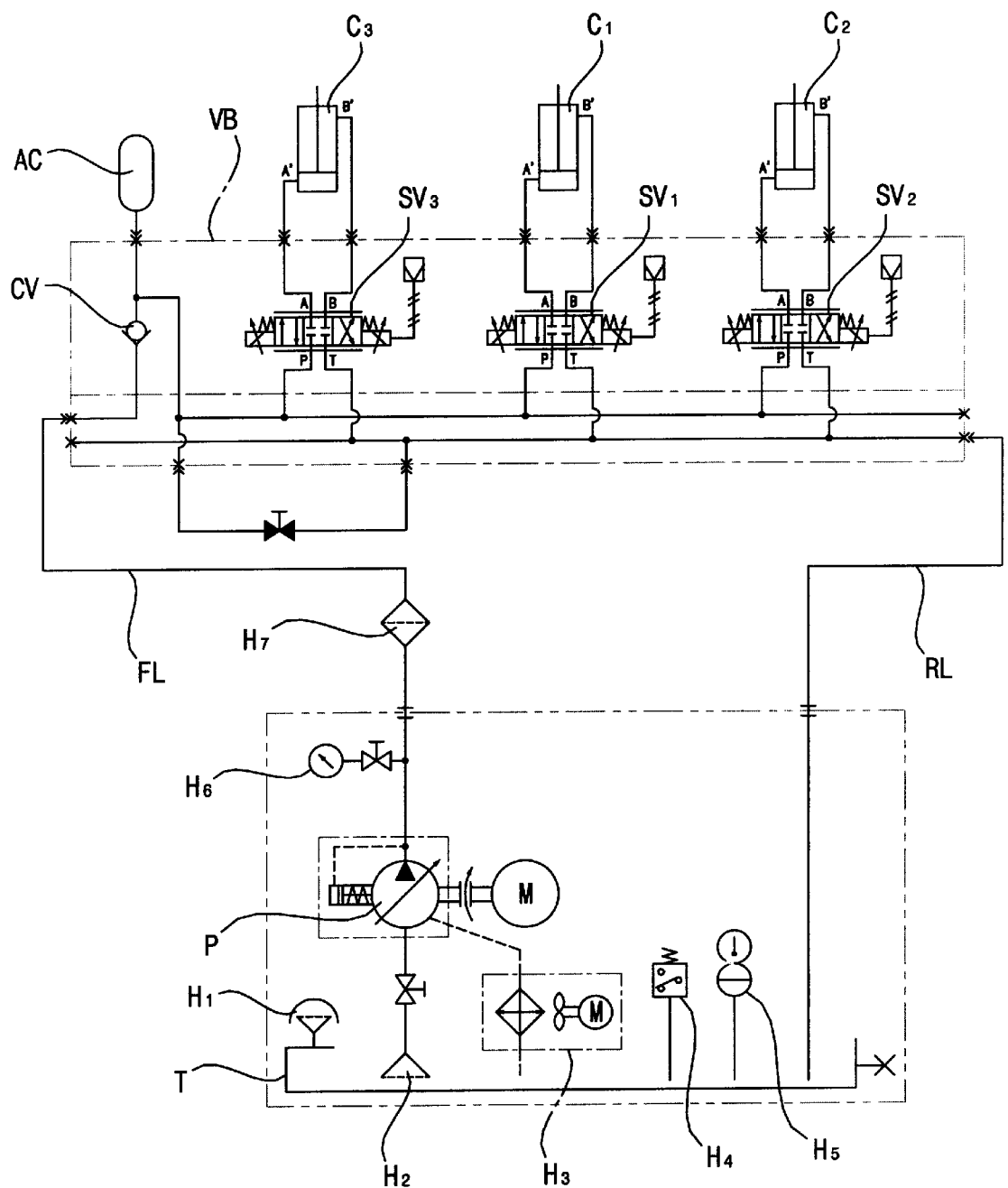
FIG. 3 is a hydraulic circuit diagram showing the drive mechanism of the motion base device according to this invention.

FIG. 3 is a circuit diagram of the motion base device of this invention. As shown in the drawing, the oil pump P, operated by a motor M, pressurizes oil of the oil tank T so as to supply pressurized oil to the three cylinder actuators $C_1$, $C_2$ and $C_3$.

The fluid supply lines FL, extending from the oil pump P to the three cylinder actuators $C_1$, $C_2$ and $C_3$, individually have a first directional control valve used for controlling the flowing direction of pressurized oil for the actuators. In the same manner, a second directional control valve is provided on each of the return lines RL extending from the three cylinder actuators $C_1$, $C_2$ and $C_3$ to the oil tank T.

An electronic 4-port/3-position servo valve SV, which completely closes four ports at its neutral position, is preferably used as each of the above first and second directional control valves. In the embodiment of this invention, three servo valves $SV_1$, $S_2$ and $SV_3$ are installed on the lines, connected to the three actuators $C_1$, $C_2$ and $C_{31}$ in the valve block VB, thus controlling the pressurized oil for or from the three actuators $C_1$, $C_2$ and $C_3$. That is, the first servo valve $SV_1$ is mounted on two lines, connected to the first actuator $C_1$, in the valve block VB, thus controlling the pressurized oil for or from the first actuator $C_1$. In the same manner, the second and third servo valves $SV_2$ and $SV_3$ are mounted on the lines, connected to the second and third actuators $C_2$ and $C_3$, in the valve block VB, thus controlling the pressurized oil for or from said second and third actuators.

The three actuators $C_1$, $C_2$ and $C_3$ individually comprise a double-acting cylinder actuator of which the piston is quickly moved in the cylinder. Each of the three actuators $C_1$, $C_2$ and $C_3$ has two ports A' and B' connected to an associated one of the three servo valves $SV_1$, $S_2$ and $SV_3$ through two lines.

The oil tank T is provided with an air breather $H_1$, a first oil filter $H_2$, a fan cooler $H_3$, an oil temperature sensor $H_4$, and a level gauge $H_5$. The air breather $H_1$ introduces atmospheric air into the tank T. The first oil filter $H_2$ filters off impurities from oil of the tank T. The fan cooler H3 cools the oil discharged from the oil tank T. The oil temperature sensor $H_4$ senses the temperature of oil from the tank T so as to selectively start or stop the fan cooler $H_3$. The level gauge Hs senses the amount of oil filled in the tank T.

On the other hand, the fluid supply lines FL, extending from the oil pump P to the three actuators $C_1$, $C_2$ and $C_3$, includes a pressure sensor $H_6$, a second oil filter $H_7$, a check valve CV, and the accumulator AC. The pressure sensor $H_6$ senses the pressure of pressurized oil from the pump P. The second oil filter $H_7$ filters off impurities from the oil of the pump P. The check valve CV prevents pressurized oil from flowing to the pump P. The accumulator AC maintains the amount of pressurized oil flowing in the fluid supply lines FL.

The construction of the motion base device of this invention is shown in FIGS. 4 to 11 in more detail.

Figure 4:
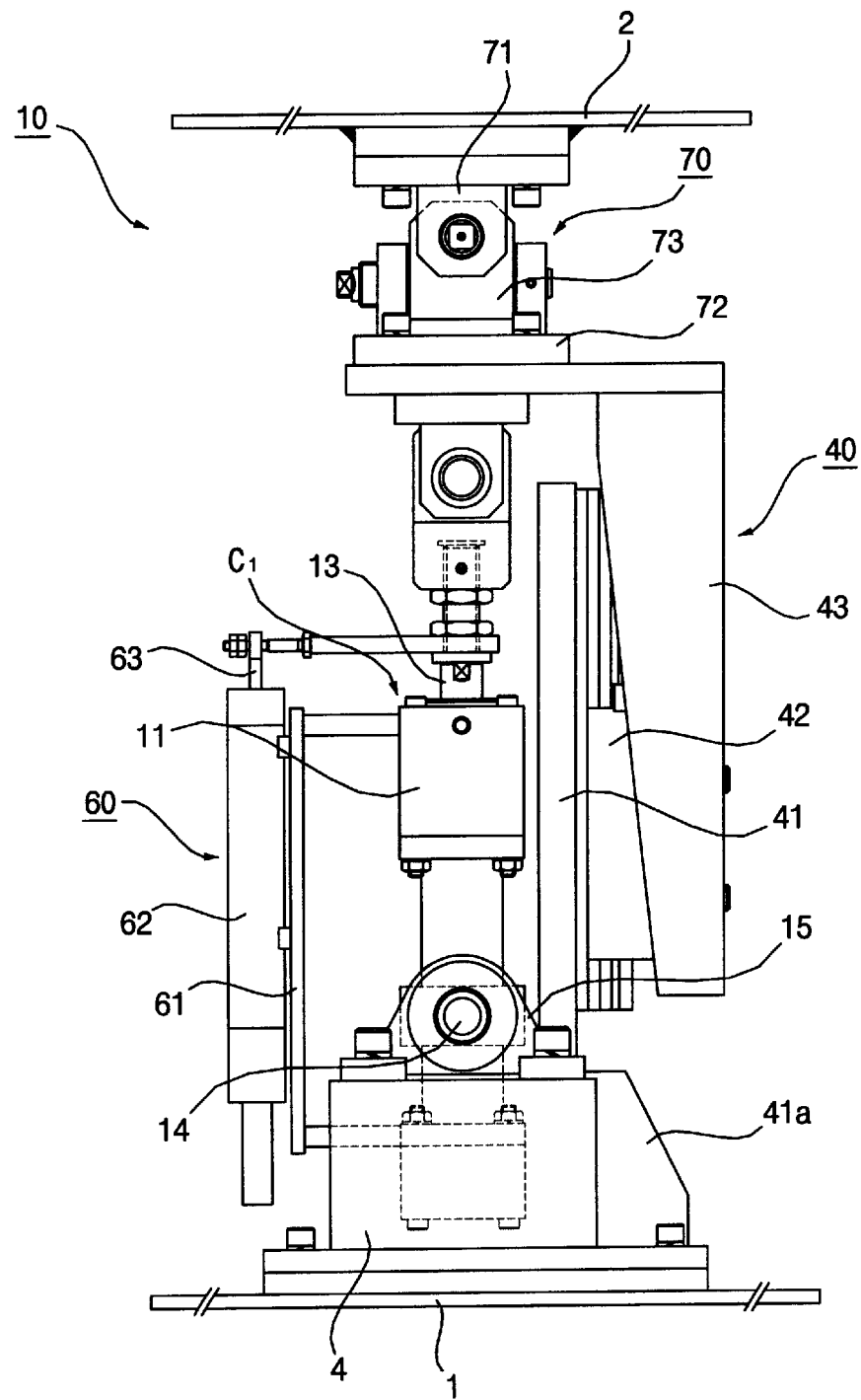
FIG. 4 is a front view of a first hydraulic actuating unit of the motion base device according to this invention.
Figure 5:
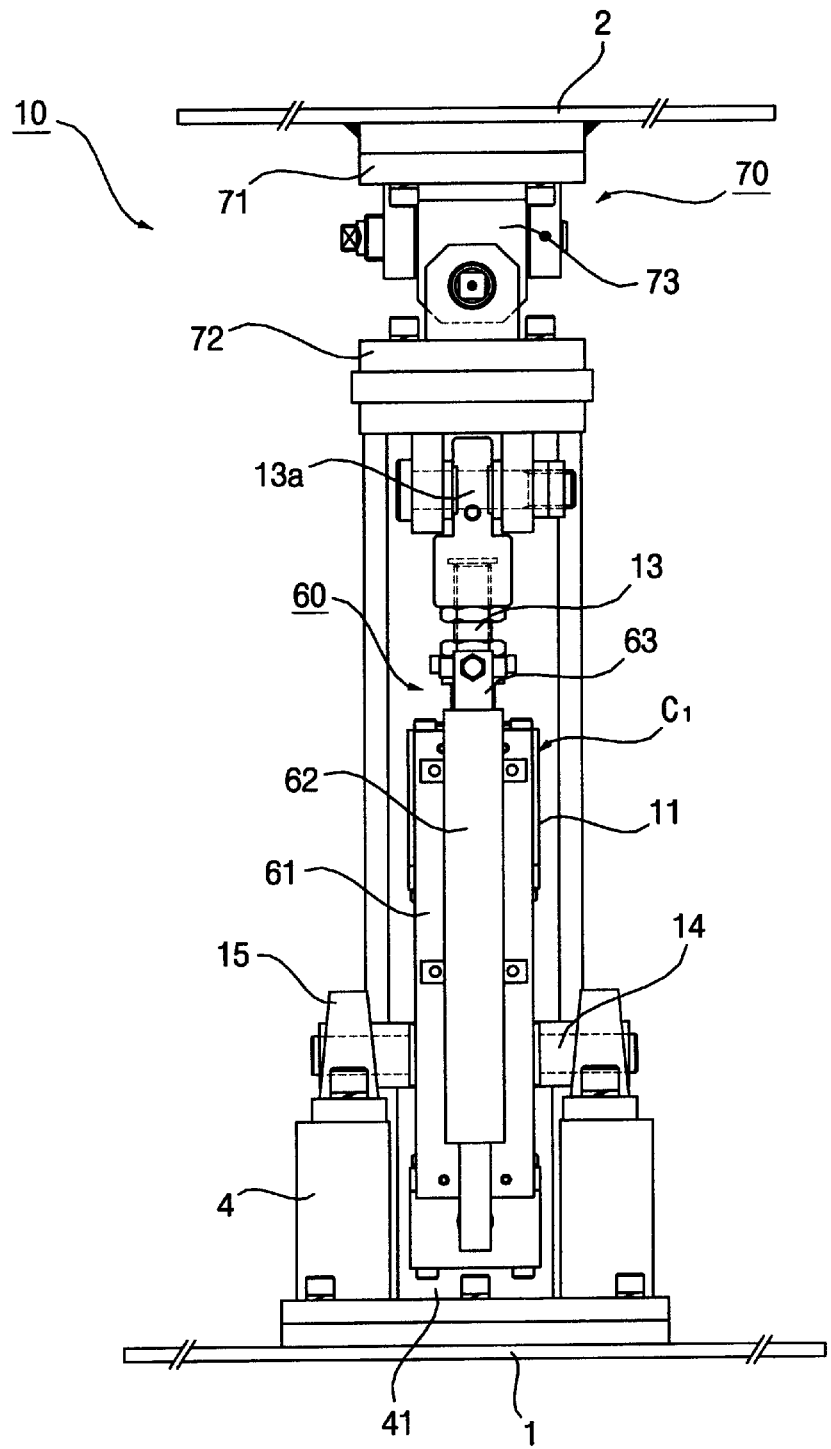
FIG. 5 is a left side view of the above first actuating unit.
Figure 6:
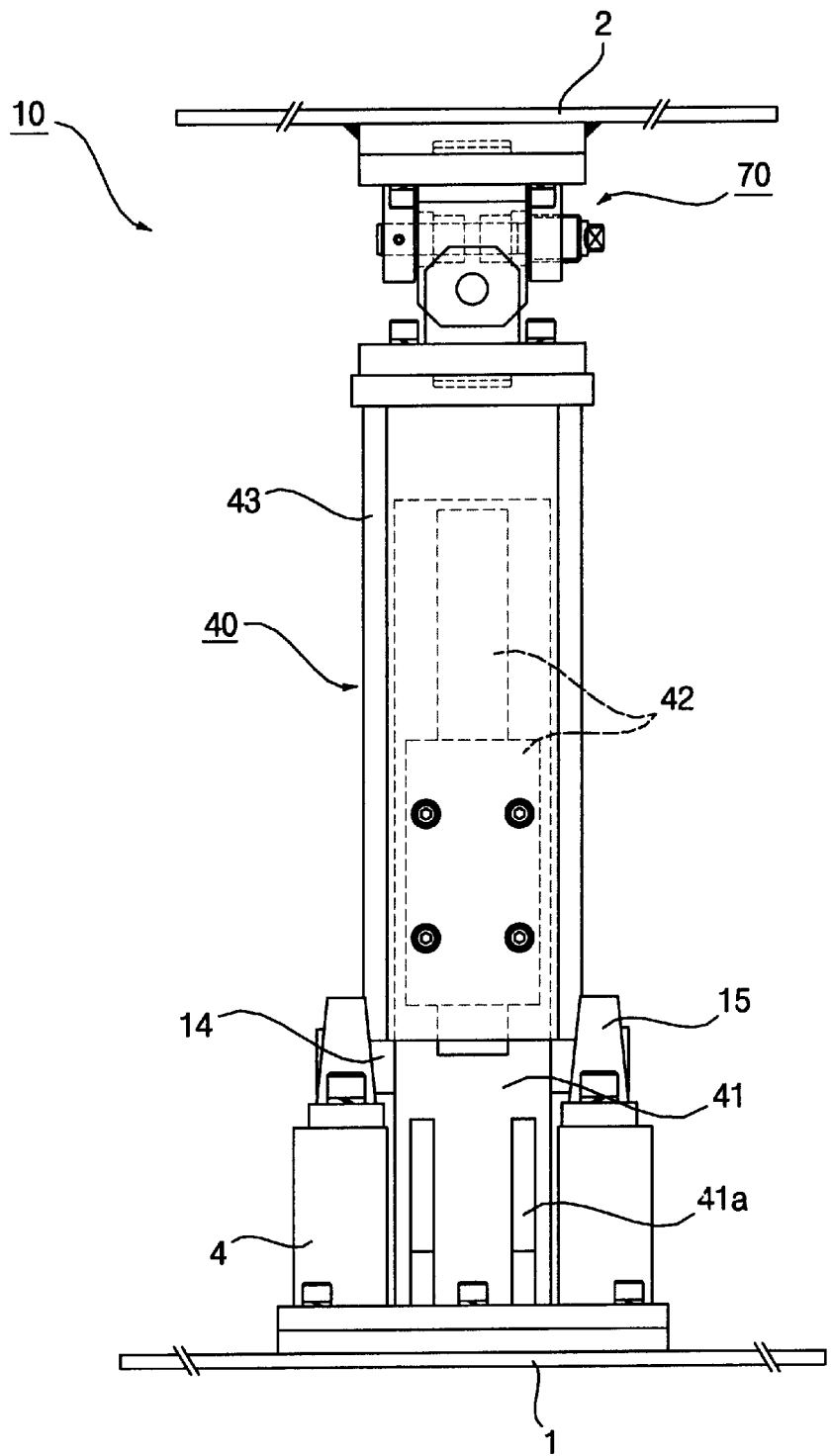
FIG. 6 is a right side view of the above first actuating unit.

FIGS. 4 to 6 are front view, left side view and right side view of the first actuating unit 10 provided with the first cylinder actuator $C_1$. As shown in the drawings, the first cylinder actuator $C_1$ is coupled to the upper plate 2 is through the first universal joint 70 and is mounted to the base plate 1 through a bearing block 15.

The above bearing block 15 is mounted to the top of two fixed blocks 4 of the base plate 1 and holds the first actuator $C_1$ in a way such that the actuator $C_1$ is rotatable around opposite shafts 14. However, the guide unit 40, extending along the first actuator $C_1$ from the base plate 1 to a position above the top end of the piston rod 13, limits a free rotating action of the first actuator $C_1$.

The above bearing block 15 of the first actuator $C_1$ is operated as follows. As described above, the first actuator $C_1$ is originally designed to move the upper plate 2 only in a vertical direction. However, during an operation of the three actuators $C_1$, $C_2$ and $C_3$, the upper plate 4 is wobbled, thus applying a lateral force to the first actuating unit 10, while the guide unit 40 limits a free rotating action of said first actuating unit 10. In such a case, the bearing block 15 allows the first actuating unit 10 to be slightly rotated from side to side and back and forth. The bearing block 15 thus allows the first actuating unit 10 to somewhat effectively absorb such a lateral force.

Of course, the lower end of the first actuator $C_1$ may be directly fixed to the base plate 1 in place of using such a bearing block 15.

The guide unit 40, used for supporting the first actuating unit 10, comprises a fixed guide 41 and a movable guide 43. The fixed guide 41 fixedly stands upright on the top surface of the base plate 1, while the movable guide 43 is coupled to both the first universal joint 70 and the top end of the piston rod 13 prior to extending downwardly. The above movable guide 43 is designed to be movable in a vertical direction along the fixed guide 41.

Two guide plates 42, individually having a longitudinally grooved surface, are provided on the opposite sides of the two guides 41 and 43 and engage with each other at their grooved surfaces, thus guiding a vertical movement of the movable guide 43 along the fixed guide 41. The above fixed guide 41 is firmly mounted to the top surface of the base plate 1 by a bracket 41a.

The first actuator $C_1$ is provided with a first linear sensor 60 for sensing a displacement of the piston rod 13. The above first linear sensor 60 comprises a sensor holder 61, a cylindrical sensor case 62, and a rod sensor 63. The sensor holder 61 is fixedly and exteriorly mounted to the side wall of the cylinder 11 of the first actuator $C_1$ in a way such that the holder 61 extends in parallel to the actuator $C_1$. The sensor case 62 is arranged along the sensor holder 61 and is fixedly held by the sensor holder 61 The rod sensor 63 is coupled to the piston rod 13 of the first actuator Cl and is movably received in the sensor case 62. The rod sensor 63 is thus axially movable relative to the sensor case 62 in accordance with a movement of the piston rod 13 relative to the cylinder 11. The linear sensor 60 thus senses a displacement of the piston rod 13 relative to the cylinder 11 of the first actuator $C_1$.

The construction of the first universal joint 70 provided in the first actuating unit 10 is similar to that of the second universal joints 70A provided in the second and third actuating units 20 and 30. The first universal joint 70 comprises first and second Y-shaped yokes 71 and 72. The first yoke 71 is fixed to the lower surface of the upper plate 2, while the second yoke 72 is fixed to the top end of the piston rod 13. The two yokes 71 and 72 are coupled to each other by a cross block 73, thus forming a universal joint 70.

The cross block 73 has a hexahedral configuration and is provided with four pins for being connected to the arms of the two yokes 71 and 72.

Figure 7:
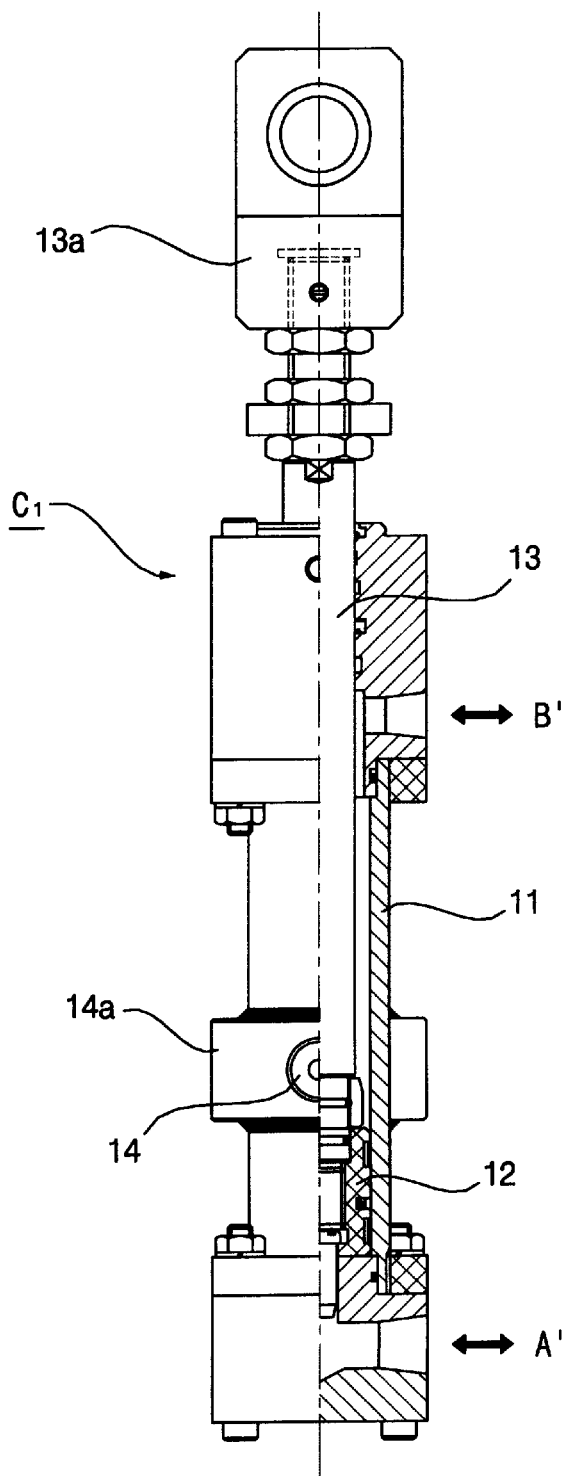
FIG. 7 is a partially broken front view of a first cylinder actuator included in the above first actuating unit.

FIG. 7 is a partially broken front view of the first cylinder actuator $C_1$ of the first actuating unit 10. As shown in the drawing, the first cylinder actuator $C_1$ comprises a cylinder 11, a piston 12 and a piston rod 13. The cylinder 11 has two ports A' and B' on its side wall at both end portions. The piston 12 is movably received in the cylinder 11, thus forming two variable chambers in the cylinder 11 with the chambers respectively communicating with the two ports A' and B'. The piston 12 is thus movable in the cylinder 11 in opposite directions in accordance with a difference between hydraulic pressures acting on both sides of the piston 12. Of course, the hydraulic pressures are generated by pressurized oil introduced into the two chambers of the cylinder 11 through the two ports A' and B'. The piston rod 13 is fixed to the piston 12 and extends out of the cylinder 11 so as to be coupled to the universal joint 70 at its outside end.

The outside end of the piston rod 13 is provided with a connector 13a and so the rod 13 is coupled to the universal joint 70 at said connector 13a. The cylinder 11 is also held on the bearing block 15 of the base plate 1 using the opposite shafts 14 in a way such that the cylinder 11 is slightly rotatable around the shafts 14. The shafts 14 integrally extend outwardly from diametrically opposite portions of a hub 14a provided on the cylinder 11.

Figure 8:
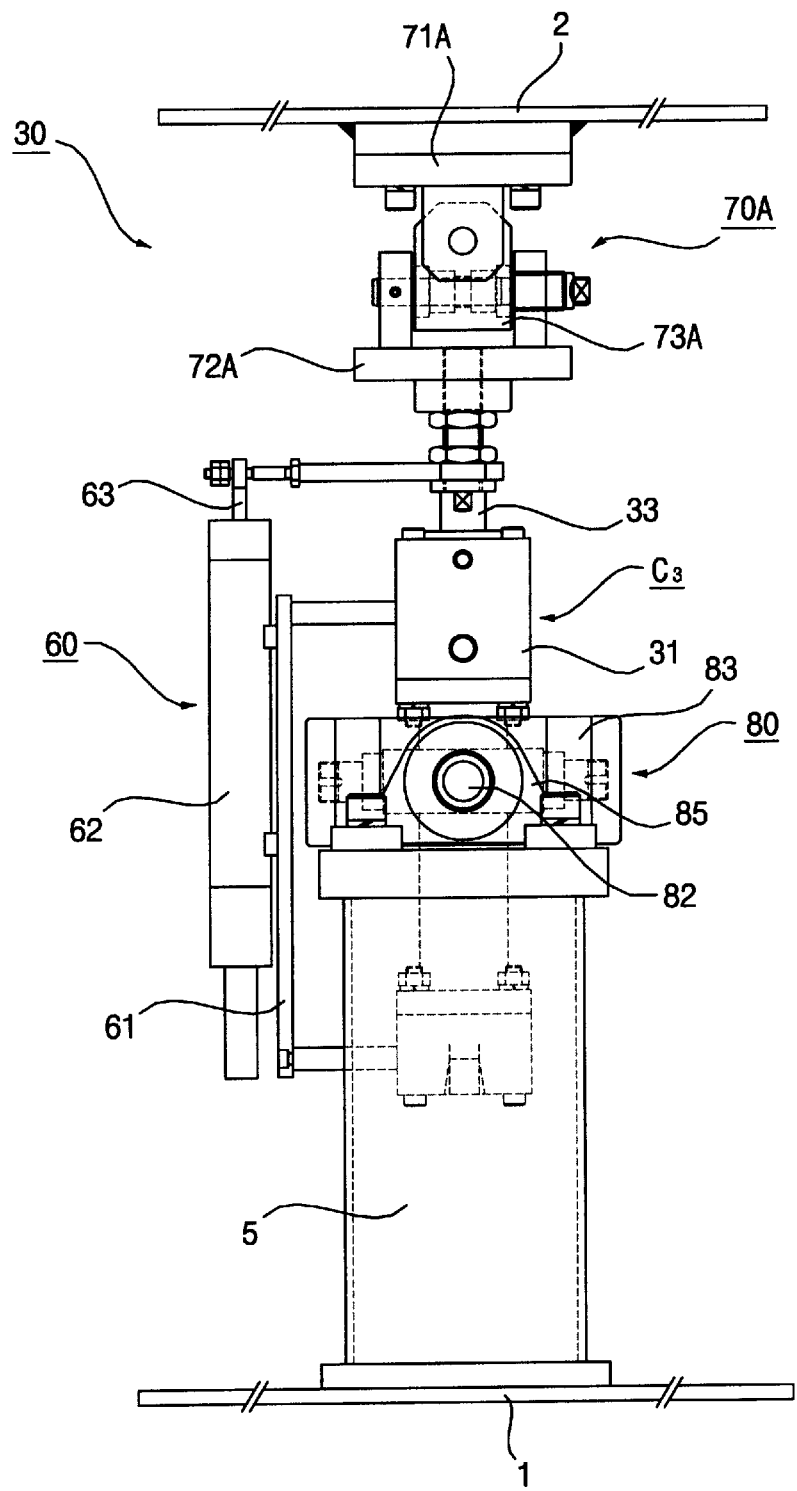
FIG. 8 is a front view of a third hydraulic actuating unit of the motion base device according to this invention.
Figure 9:
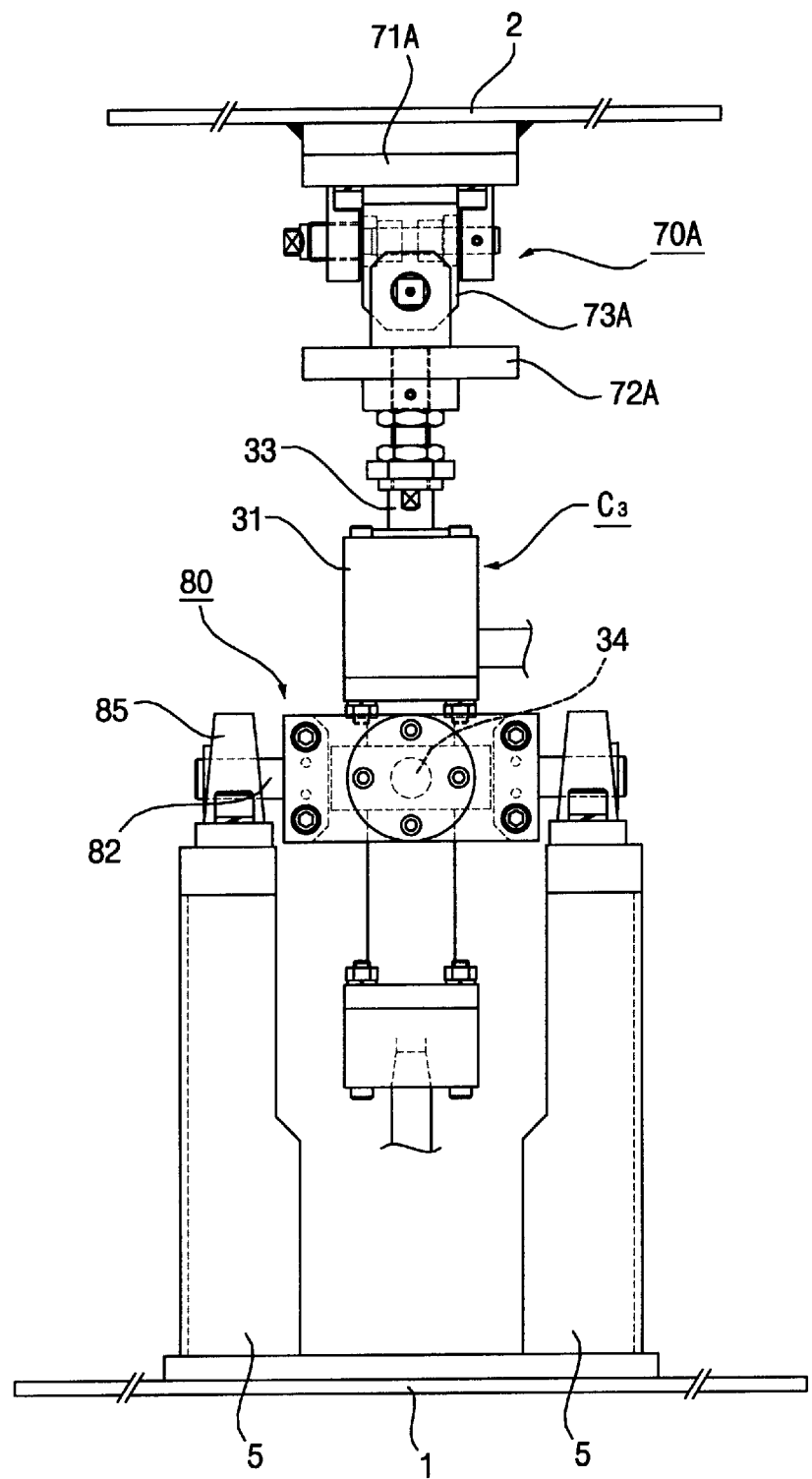
FIG. 9 is a side view of the above third actuating unit.

FIGS. 8 and 9 are front and side views of each of the second and third hydraulic actuating units 20 and 30, individually including a cylinder actuator $C_2$, $C_3$. In the preferred embodiment, the second and third actuating units 20 and 30 have the same construction and so only the construction of the third actuating unit 30 is shown in FIGS. 8 and 9.

As shown in FIGS. 8 and 9, different from the first actuating unit 10 designed to be freely tiltable only at its upper end portion by the first universal joint 70, the second and third actuating units 20 and 30 are individually designed to be tiltable at their upper and lower end portions.

That is, each of the cylinder actuators $C_2$ and C3 of the second and third actuating units 20 and 30 is jointed to the upper plate 2 at its upper end through a second universal joint 70A and is jointed to two fixed blocks 5 of the base plate 1 at its lower end through a joint block 80.

Therefore, due to the second universal joints 70A and joint blocks 80, the second and third actuating units 20 and 30 allow the upper plate 2 to be freely wobbled when there is a difference between the extended lengths of the piston rods 13, 23 and 33 of the three cylinder actuators $C_1$, $C_2$ and $C_3$.

Each of the second universal joints 70A has a construction similar to that of the first universal joint 70 of the first cylinder actuator $C_1$. That is, each second universal joint 70A comprises two Y-shaped yokes 71A and 72A. The first yoke 71A is fixed to the lower surface of the upper plate 2, while the second yoke 72A is fixed to the top end of the piston rod 23, 33 of each of the second and third cylinder actuators $C_2$ and $C_3$. The two yokes 71A and 72A are coupled to each other by a cross block 73A, thus forming a universal joint 70A.

The joint block 80 is mounted to the top of the two fixed blocks 5 standing upright on the top surface of the base plate 1 as shown in FIG. 9. The two fixed blocks 5 are spaced apart from each other in a way such that the blocks 5 allow the lower end of an associated cylinder actuator $C_2$, $C_3$ to be movable.

As shown in FIG. 8, each of the second and third actuating units 20 and 30 is provided with a second linear sensor 60 for sensing a displacement of the piston rod 23, 33 of an associated cylinder actuator $C_2$, $C_3$. In the same manner as that described for the first linear sensor 60 of the first actuating unit 10, the second linear sensor 60 comprises a sensor holder 61, a cylindrical sensor case 62, and a rod sensor 63. The position and construction of the sensor holder 61, the cylindrical sensor case 62 and the rod sensor 63 of the second sensor 60 remains the same as that of the first linear sensor 60 and further explanation is thus not deemed necessary.

Figure 10:
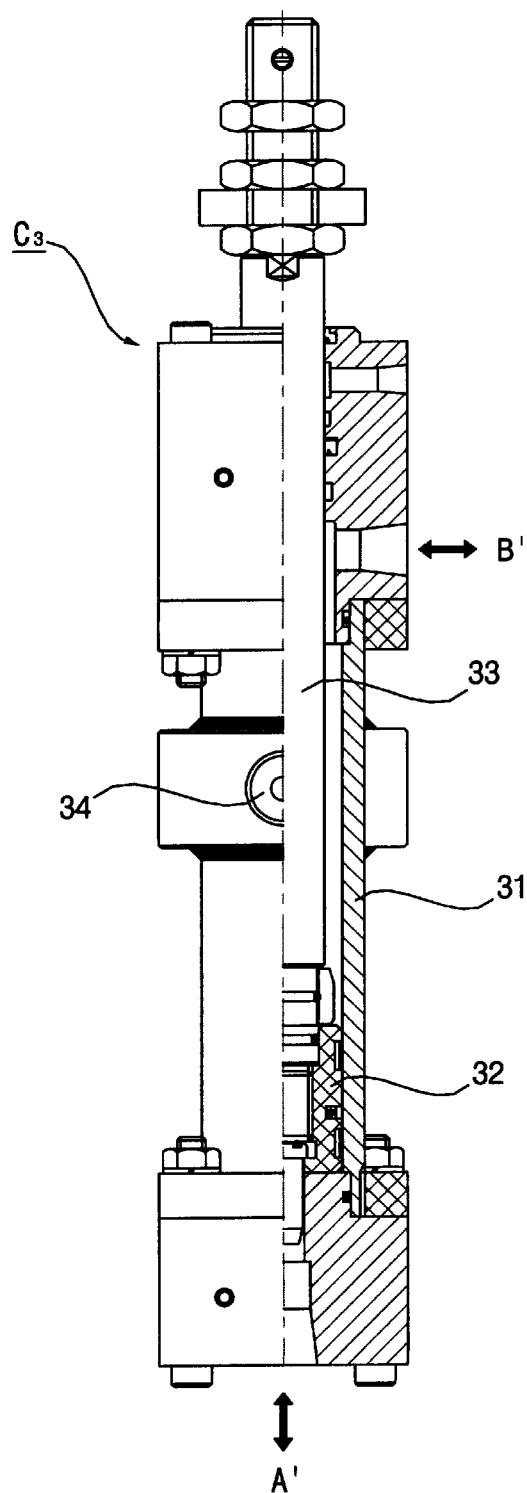
FIG. 10 is a partially broken front view of a third cylinder actuator included in the above third actuating unit.

FIG. 10 is a partially broken front view of each of the second and third cylinder actuators $C_2$ and $C_3$. As shown in the drawing, each of the second and third cylinder actuators $C_2$ and $C_3$ comprises a cylinder 31, a piston 32 and a piston rod 33. The cylinder 31 has two ports A' and B' on its side wall at both end portions. The piston 32 is movably received in the cylinder 31, thus forming two variable chambers in the cylinder 31. The piston 32 is thus movable in the cylinder 31 in opposite directions in accordance with a difference between hydraulic pressures acting on both sides of the piston 32. Of course, the hydraulic pressures are generated by pressurized oil introduced into the two chambers of the cylinder 31 through the two ports A' and B'. The piston rod 33 is fixed to the piston 32 and extends out of the cylinder 31 so as to be coupled to the universal joint 70A at its outside end.

Two shafts 34 are exteriorly provided at diametrically opposite portions of the cylinder 31 and extend outwardly in opposite directions. The cylinder 31 is mounted to the joint block 80 by said shafts 34. The above shafts 34 are positioned higher than the shafts 14 of the first cylinder actuator $C_1$.

Figure 11:
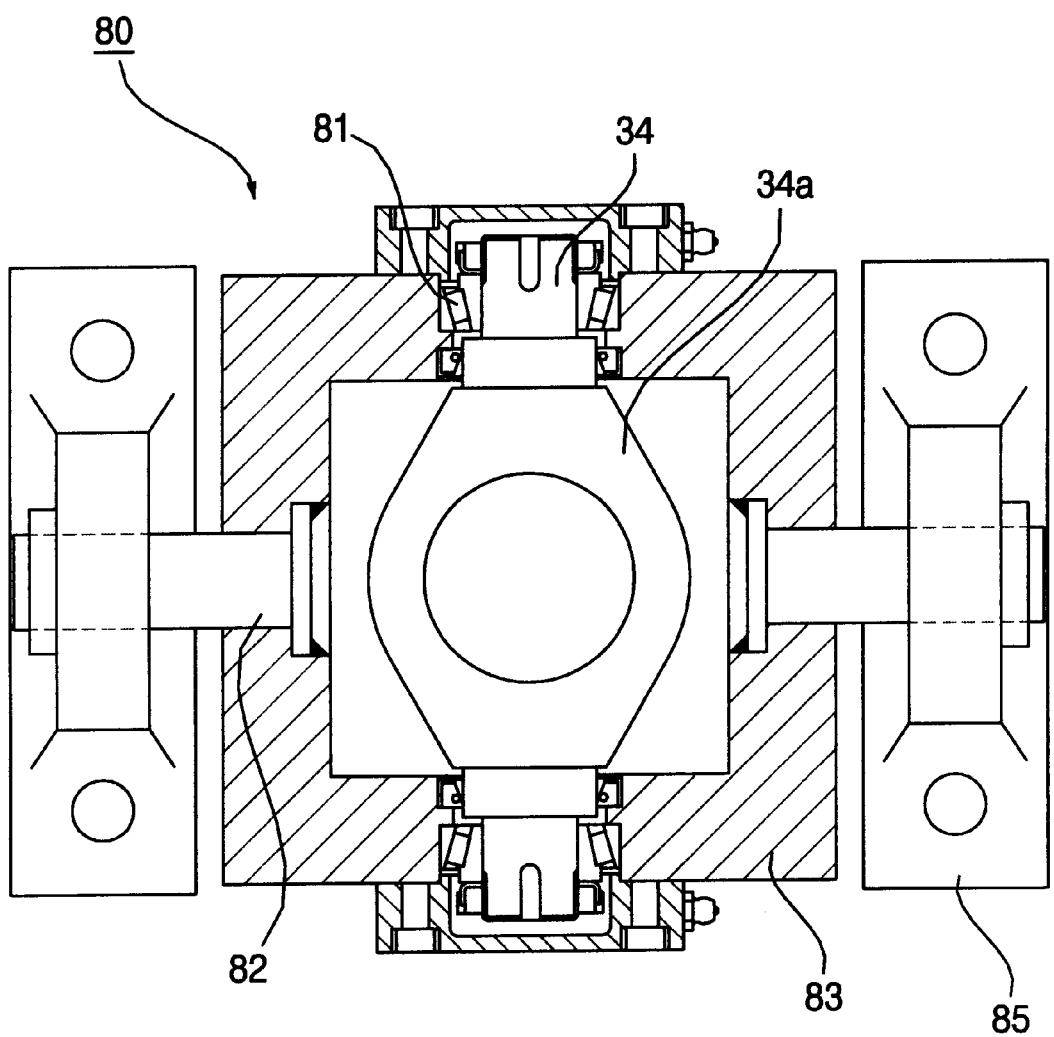
FIG. 11 is a plan sectional view of a joint block of the motion base device according to this invention.

FIG. 11 is a plan sectional view of the joint block 80 provided at the lower end of each of the second and third cylinder actuators $C_2$ and $C_3$. As shown in the drawing, the joint block 80 comprises a middle block 83 and two outside blocks 85. The middle block 83 receives the cylinder 31 of each of the second and third cylinder actuators $C_2$ and $C_3$ and rotatably supports the shafts 34 of the cylinder 31 by two roller bearings 81. In the same manner as that described for the shafts 14 of the first cylinder actuator $C_1$, the shafts 34 integrally extend outwardly from diametrically opposite portions of a hub 34a provided on the cylinder 31. Two second shafts 82 integrally extend outwardly from diametrically opposite portions of the middle block 83 in a way such that the second shafts 82 are perpendicular to the shafts 34 of the cylinder 31. The two outside blocks 85 are fixedly mounted to the top of the fixed blocks 5 and rotatably support the second shafts 82 of the middle block 83 using two roller bearings.

The operational effect of the above motion base device will be described hereinbelow in conjunction with FIGS. 12 to 18.

FIGS. 12 to 18 are views showing the operation of the motion base device of this invention. As shown in the drawings, a simulating cabin 2' is installed on the upper plate 2 and so the simulating cabin 2' is heaved, pitched and/or rolled by the three hydraulic actuating units 10, 20 and 30.

Figure 12:
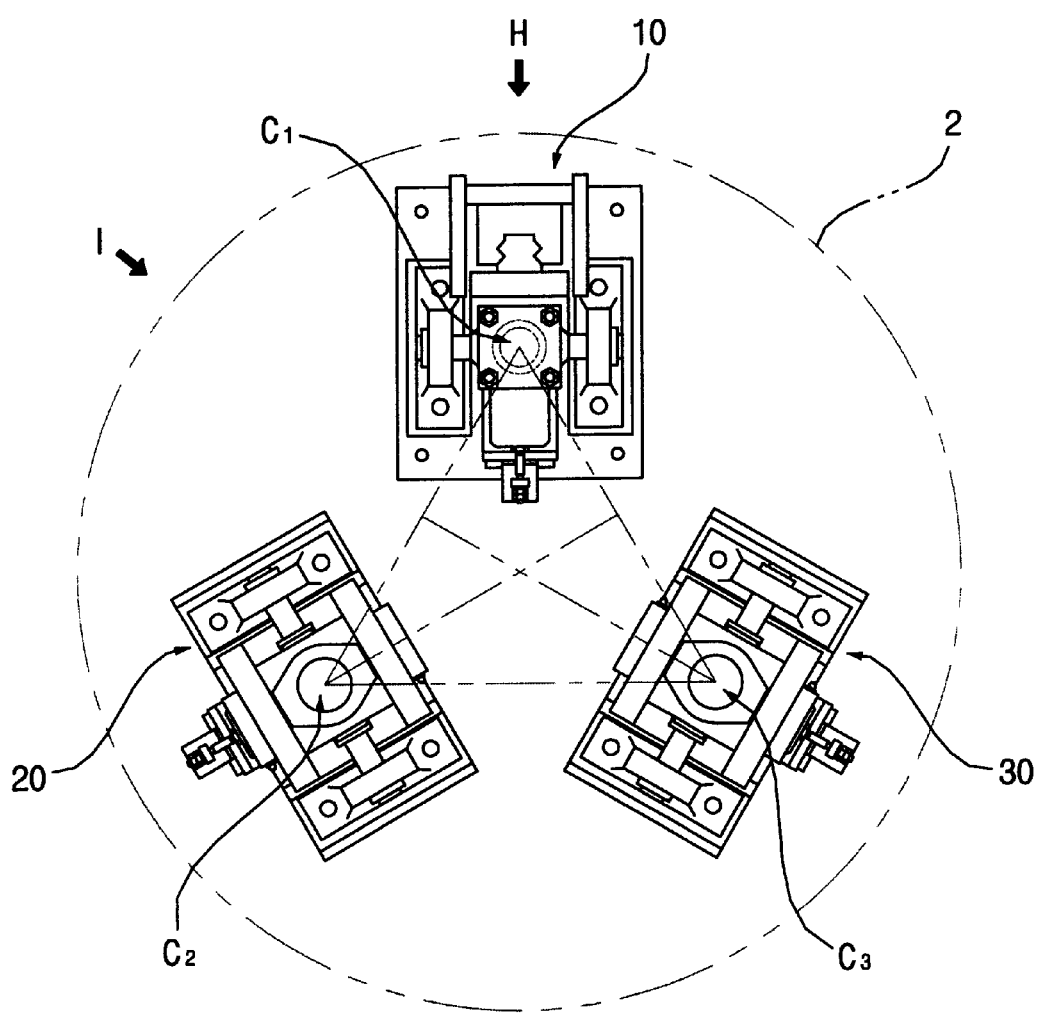
FIG. 12 is a view showing the arrangement of the first to third hydraulic actuating units included in the motion base device of this invention.
Figure 13:
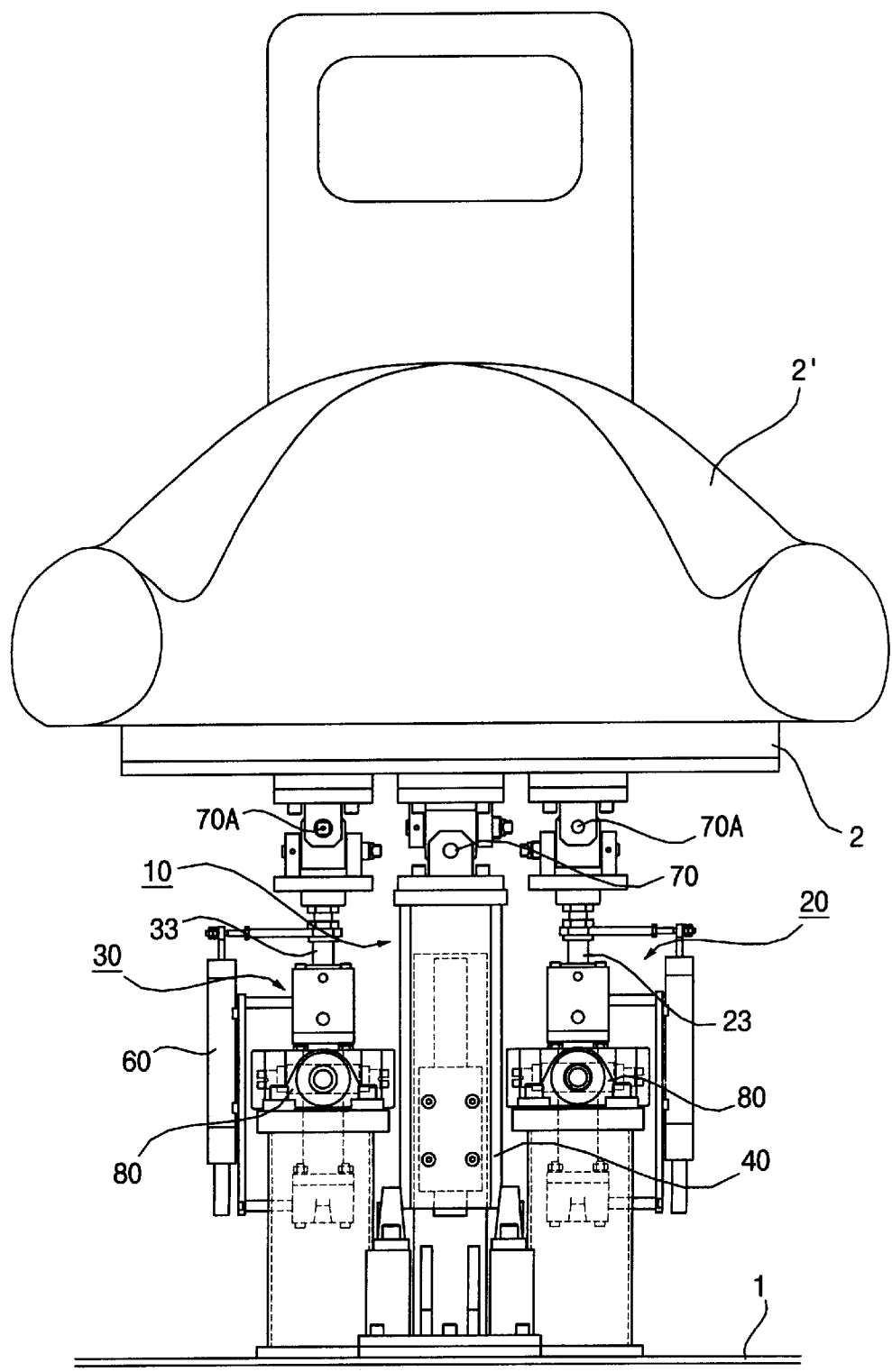
FIGS. 13 and 14 are views showing the operation of the motion base device of this invention when the device moves a simulating cabin in a vertical direction.
Figure 14:
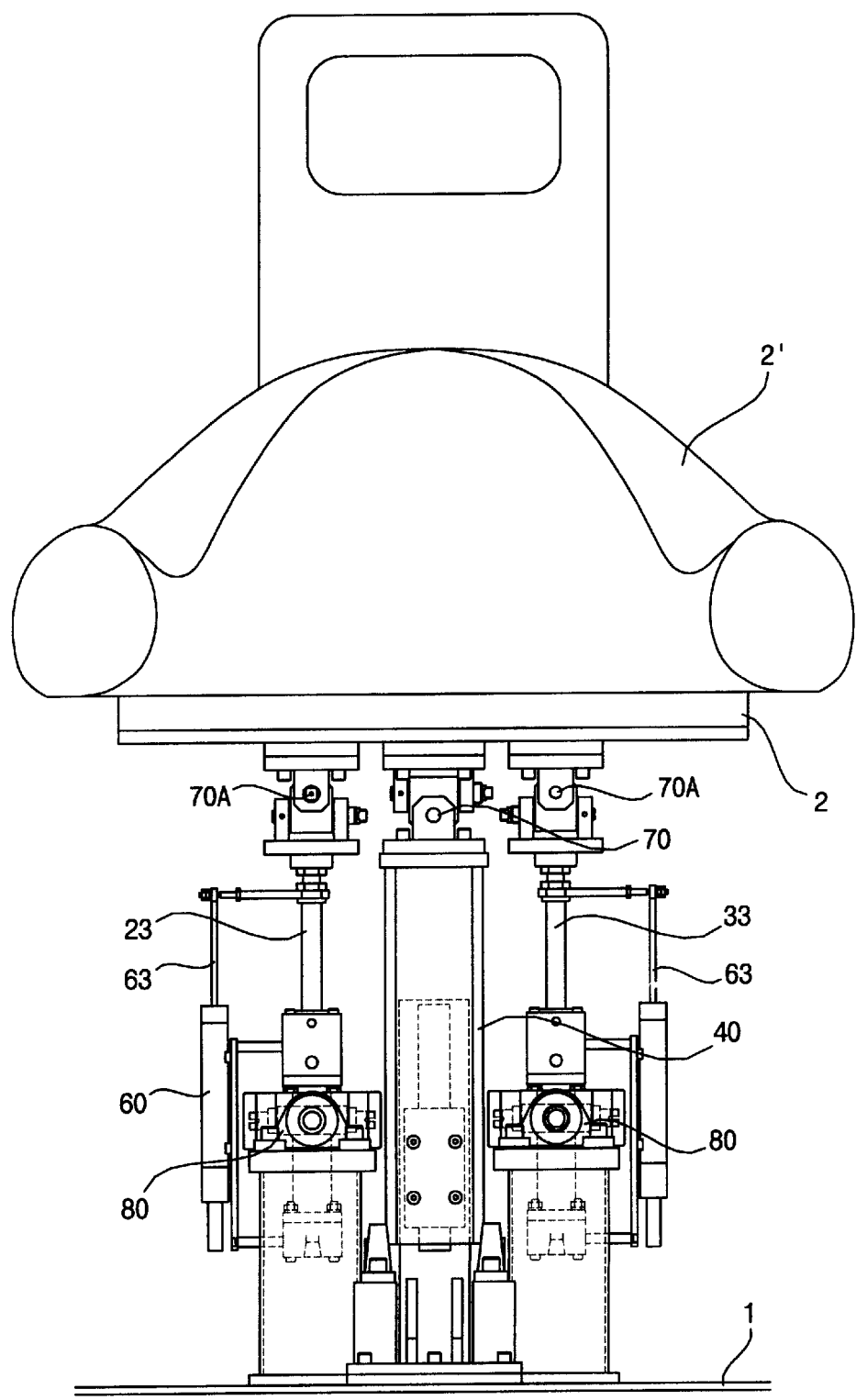

FIGS. 13 and 14 are views showing the operation of the motion base device, heaving the simulating cabin 2' up and down in a vertical direction, when seeing the device in a direction as shown by the arrow "H" in FIG. 12. In such a case, the three cylinder actuators $C_1$ to $C_3$ are operated in a vertical direction with the same displacement, thus heaving the simulating cabin 2'.

That is, in order to heave the simulating cabin 2' in a vertical direction, the valve spool of each of the three servo valves SV is moved to the right in the drawings. Therefore, the ports A of the three servo valves SV communicate with the oil pump P, while the ports B of the valves SV communicate with the oil tank T. In such a case, oil is discharged from the lower chambers of the cylinders 11 and 31 of the three actuators $C_1$ to $C_3$ through the ports A', while new pressurized oil is introduced into the upper chambers of the cylinders 11 and 31 through the ports B'. This allows the pistons of the three actuators $C_1$ to $C_3$ to move upwardly in the cylinders along with the piston rods 13, 23 and 33, thus heaving the simulating cabin 2'.

On the other hand, when the valve spool of each of the three servo valves SV is moved to the left in the drawings, the pistons of the three actuators $C_1$ to $C_3$ along with their piston rods 13, 23 and 33 move downwardly in the cylinders, thus descending the simulating cabin 2'.

As shown in FIGS. 13 and 14, neither of the three actuating units 10, 20 and 30 is tilted at the universal joints 70 and 70A or the joint blocks 80 during such a vertical movement of the simulating cabin 2'. In such a case, the piston rods 13, 23 and 33 of the three cylinder actuators $C_1$ to $C_3$ linearly move in a vertical direction under the guide of the guide units 40. In addition, the rod sensors 63 of the linear sensors 60 linearly move in a vertical direction along with the piston rods 13, 23 and 33, thus allowing the sensors 60 to sense the lengths of the piston rods 13, 23 and 33 out of the cylinders.

When the three servo valves SV are in their neutral positions, the four ports of each servo valve SV are completely closed. In such a case, pressurized oil does not pass through the servo valves SV and so the piston rods 13, 23 and 33 stop. The simulating cabin 2' is thus stopped.

Figure 15:
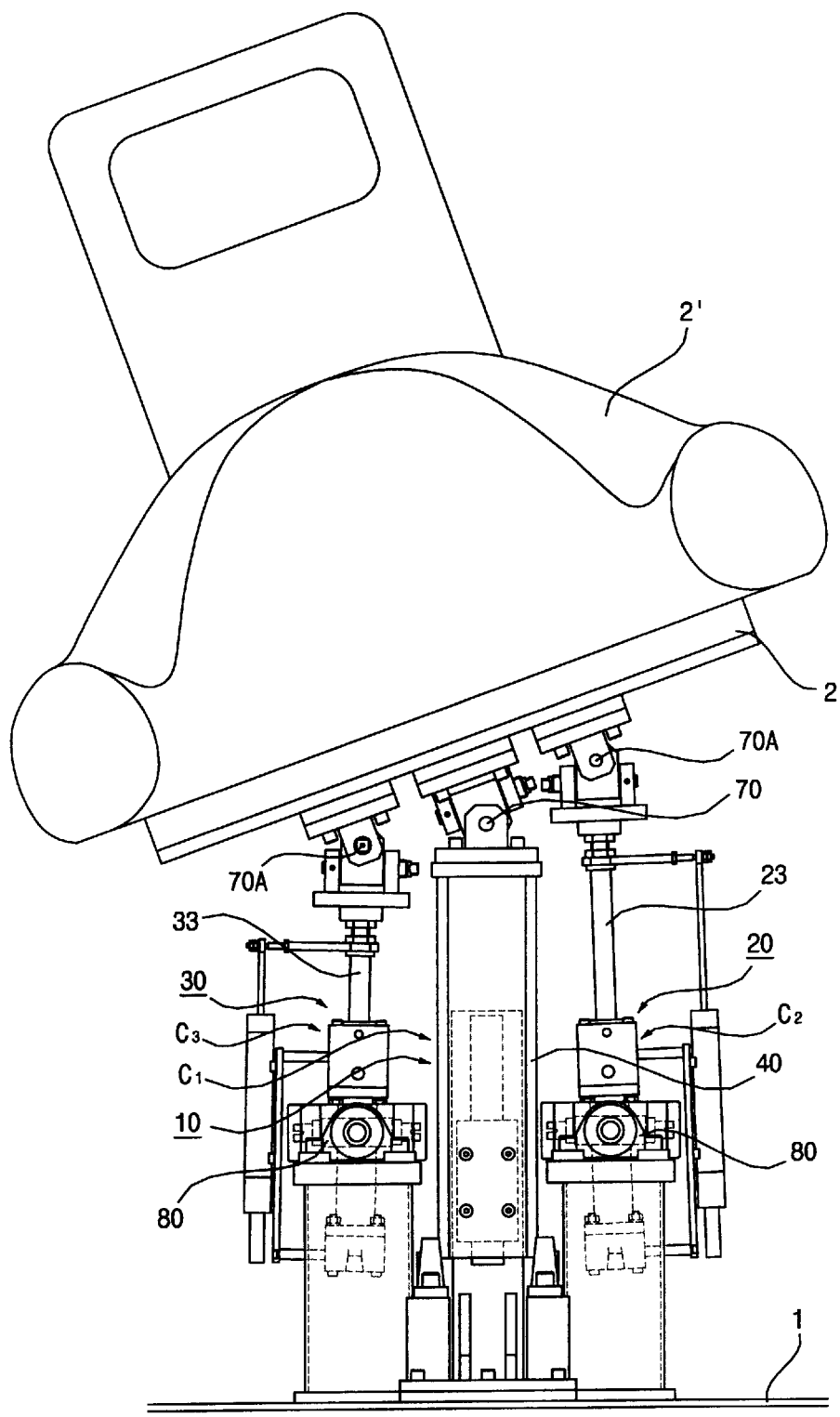
FIGS. 15 and 16 are views showing the operation of the motion base device of this invention when the device rolls the simulating cabin from side to side.
Figure 16:
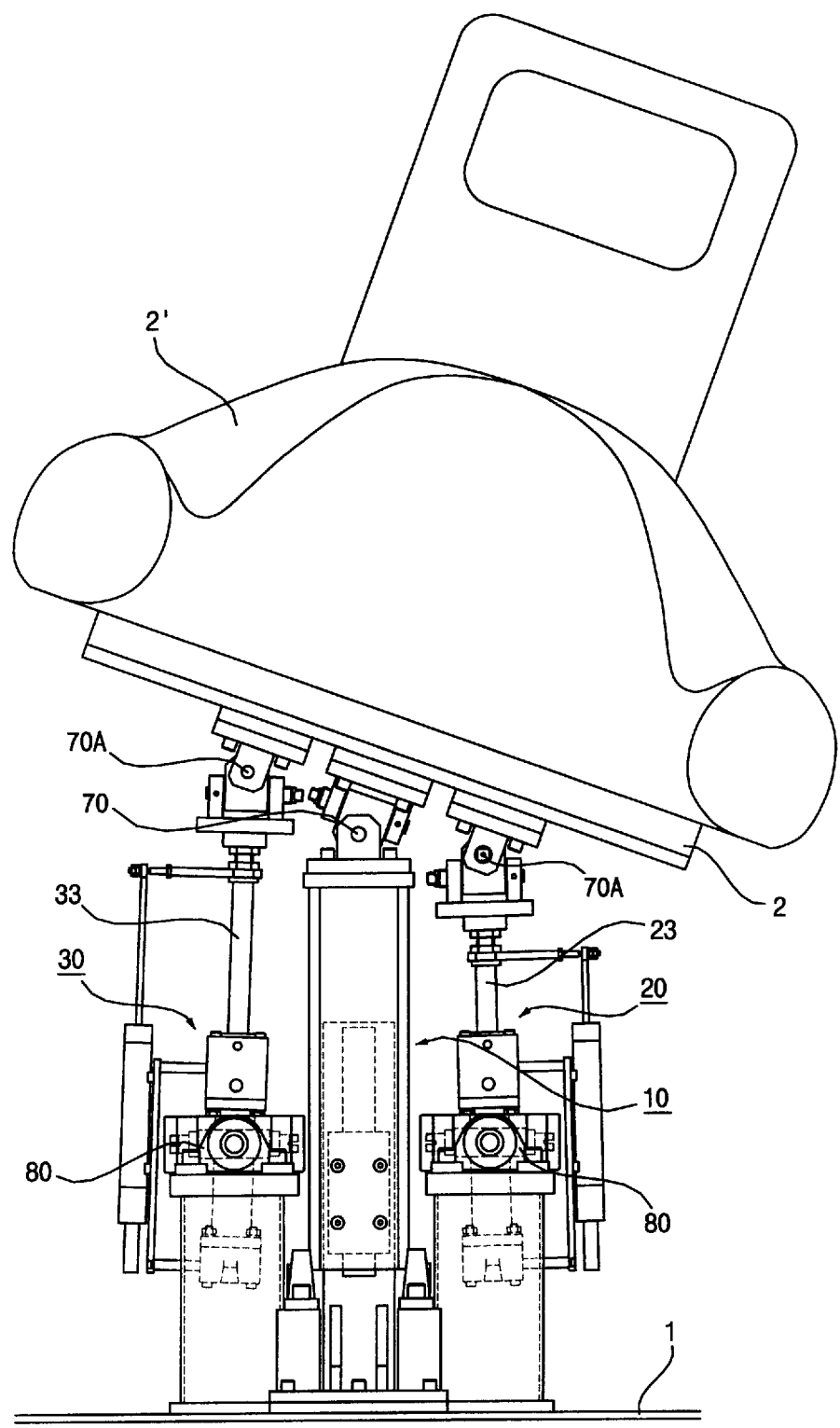

FIGS. 15 and 16 are views showing the operation of the motion base device, rolling the simulating cabin 2' from side to side, when seeing the device in the direction as shown by the arrow "H" in FIG. 12. As shown in the drawings, the simulating cabin 2'is rolled from side to side due to a difference between the heights of the three actuating units 10, 20 and 30.

That is, in order to roll the cabin 2' from the horizontal position of FIG. 14 to a leftward tilted position of FIG. 15, the piston rod 13 of the first actuating unit 10 is stopped, while the piston rods 23 and 33 of the second and third actuating units 20 and 30 move relative to their cylinders 31 in a way such that the piston rod 33 of the third actuating unit 30 is positioned lower than the piston rod 33 of the second actuating unit 20.

In order to accomplish such a leftward tilted position of the cabin 2', the valve spool of the servo valve $SV_1$ for the first cylinder actuator $C_1$ is neutrally positioned. In addition, the valve spool of the servo valve $SV_3$ for the third cylinder actuator $C_3$ is moved to the left in the drawing, thus allowing the oil pump P to communicate with the port B of said valve $SV_3$. On the other hand, the valve spool of the servo valve $SV_2$ for the second cylinder actuator C2 is moved to the right in the drawing, thus allowing the oil pump P to communicate with the port A of said valve $SV_2$. When the valve spools of the three servo valves SV are positioned as described above, the simulating cabin 2' is rolled to the leftward tilted position.

In such a case, the second and third cylinder actuators $C_2$ and $C_3$ are individually tilted at both the universal joint 70A and the joint block 80, while a lateral force is applied to the first cylinder actuator $C_1$. However, the first cylinder actuator $C_1$ is effectively supported by the guide unit 40 irrespective of such a lateral force.

On the other hand, a rightward tilted position of the cabin 2' shown in FIG. 16 is accomplished as follows. That is, the valve spool of the servo valve $SV_1$ for the first cylinder actuator $C_1$ is neutrally positioned, while the valve spools of the servo valves $SV_2$ and $SV_3$ for the second and third cylinder actuators $C_2$ and $C_3$ are respectively moved to the left and right in the drawings. When the valve spools of the three servo valves SV are positioned as described above, the simulating cabin 2' is rolled to the rightward tilted position.

Figure 17:
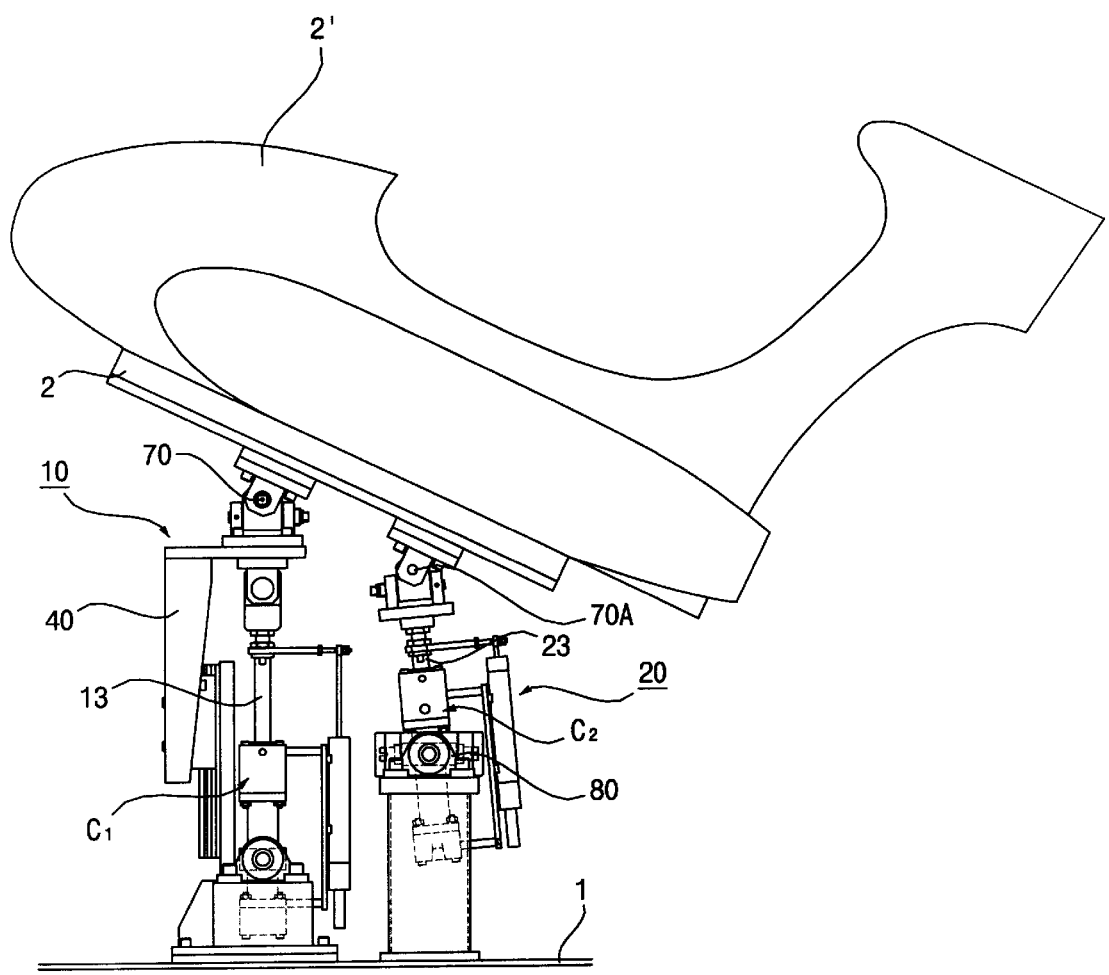
FIGS. 17 and 18 are views showing the operation of the motion base device of this invention when the device pitches the simulating cabin back and forth.
Figure 18:
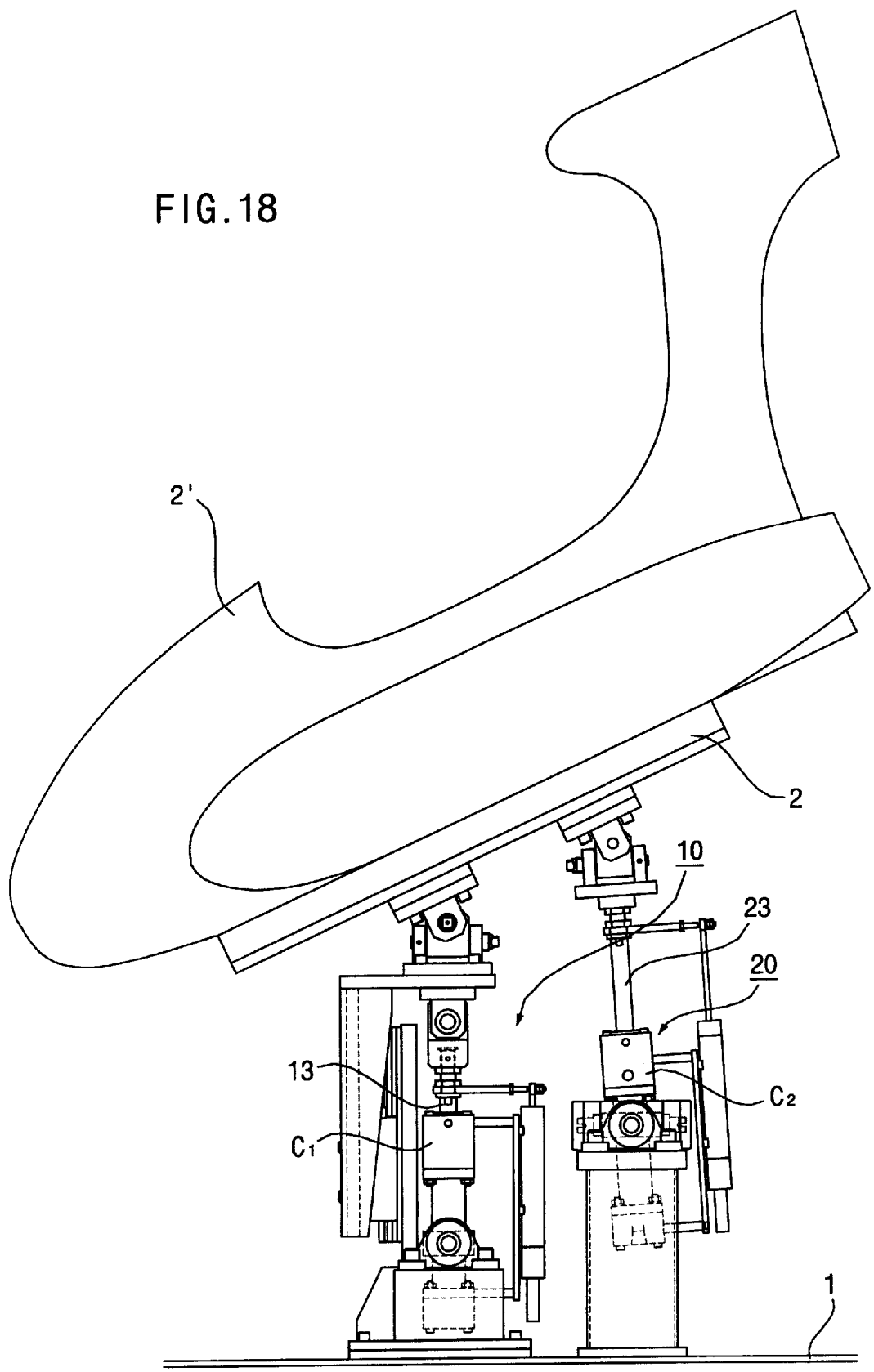

FIGS. 17 and 18 are views showing the operation of the motion base device of this invention, pitching the simulating cabin 2' back and forth, when seeing the device in a direction as shown by the arrow "I" in FIG. 12. In the drawings, the third actuating unit 30 is not shown.

In order to pitch the simulating cabin 2' back and forth, the second and third actuating units 20 and 30 are operated in a way such that said units 20 and 30 have a height higher or lower than that of the first actuating unit 10.

That is, in order to pitch the cabin 2' back as shown in FIG. 17, it is necessary for the first actuating unit 10 to ascend and for the second and third actuating units 20 and 30 to commonly descend. In order to move the three units 10, 20 and 30 as described above, the valve spool of the servo valve $SV_1$ for the first cylinder actuator Cl has to be moved to the right, while each of the valve spools of the servo valves $SV_2$ and $SV_3$ for the second and third cylinder actuators $C_2$ and $C_3$ has to be moved to the left.

On the other hand, in order to pitch the cabin 2' forth as shown in FIG. 18, it is necessary for the first actuating unit 10 to descend and for the second and third actuating units 20 and 30 to commonly ascend. The valve spool of the servo valve $SV_1$ for the first cylinder actuator $C_1$ has to be moved to the left, while each of the valve spools of the servo valves $SV_2$ and $SV_3$ for the second and third cylinder actuators $C_2$ and $C_3$ has to be moved to the right.

The independent operation of the three cylinder actuators $C_1$ to $C_3$ for heaving, rolling or pitching the simulating cabin 2' is expressed in the following Table.

TABLE

|  | 1st actuator | 2nd actuator | 3rd actuator |
| --- | --- | --- | --- |
| heaving up | ascending | ascending | ascending |
| heaving down | descending | descending | descending |
| rolling to left | — | ascending | descending |
| rolling to right | — | descending | ascending |
| pitching back | ascending | descending | descending |
| pitching forth | descending | ascending | ascending |

As described above, the motion base device of this invention has three actuating units 10, 20 and 30, individually having a hydraulic cylinder actuator $C_1$, $C_2$, $C_3$, and freely heaves, rolls and/or pitches a simulating cabin 2' by independently controlling the heights of the three actuating units. When the motion base device heaves, rolls and pitches the simulating cabin 2' at the same time, the device gives real and active conditions to the simulating cabin 2', thus allowing users to practice in the simulating cabin representing such real and active conditions.

The motion base device of this invention is also provided with a computer for analyzing the simulating software and controlling the hydraulic pressure supply unit 50 which includes an oil pump P, a plurality of servo valves SV, etc. The above computer preferably controls the hydraulic pressure supply unit 50 in response to displacement signals output from the linear sensors 60 of the three actuating units 10, 20 and 30.

Different from a typical motion base device with six cylinder actuators, the computer-aided motion base device of this invention only uses three cylinder actuators while effectively and dynamically heaving, rolling and pitching a simulating cabin under the control of a computer. The motion base device of this invention thus gives real and active conditions to the simulating cabin and allows users to practice in the simulating cabin representing such real and active conditions.

Since the motion base device of this invention only uses three cylinder actuators, the construction of the device is simplified and so it is easy to manage the device in comparison with a typical motion base device having six cylinder actuators. In addition, since the manufacturing cost of the motion base device is reduced, the device of this invention is effectively used with one or two-seater simulators in addition to multi-seater simulators.

Another advantage of the motion base device of this invention resides in that the device, having the simplified construction, is easily controlled and gives real and active conditions to simulators.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motion base device for simulators, comprising:
   a base plate;
   an upper plate positioned above said base plate while being spaced apart from the base plate with a simulating cabin being carried on said upper plate;
   first to third cylinder actuators vertically positioned between said base and upper plates so as to at least heave, pitch roll the upper plate relative to the base plate, said first to third cylinder actuators being respectively placed at apexes of a triangle, said first cylinder actuator being mounted to the base plate at a lower end thereof and being jointed to the upper plate at an upper end thereof using universal means, and each of said second and third cylinder actuators being jointed to said base and upper plates at lower and upper ends thereof using universal joint means; and
   a hydraulic pressure supply unit used for supplying pressurized oil to the three cylinder actuators so as to allow the three cylinder actuators to be independently operated.

2. The motion base device according to claim 1, wherein a guide unit vertically extends along the first cylinder actuator from said base plate to a position above the upper end of the first cylinder actuator, thus supporting the first cylinder actuator while guiding a vertical movement of the first cylinder actuator, said guide unit comprising:
   a fixed guide fixedly standing upright on a top surface of said base plate; and
   a movable guide extending downwardly from the upper end of the first cylinder actuator and engaging with the fixed guide so as to be linearly movable under the guide of said fixed guide.

3. The motion base device according to claim 2, wherein said first cylinder actuator is mounted to the base plate at the lower end thereof using hinge means, but is not rotatable at the lower end due to said guide unit.

4. The motion base device according to claim 1, wherein said first to third cylinder actuators are respectively placed at apexes of an exact triangle.

5. The motion base device according to claim 1, wherein the universal joint means, used for jointing each of the first to third cylinder actuators to the upper plate, comprises a universal joint having two Y-shaped yokes, said two yokes being respectively connected to the upper plate and an associated cylinder actuator and being coupled to each other by a cross block.

6. The motion base device according to claim 1, wherein the universal joint means, used for jointing each of the second and third cylinder actuators to the base plate, is mounted to a top of two spaced and fixed blocks, said two fixed blocks standing upright on the base plate.

7. The motion base device according to claim 6, wherein the universal joint means, used for jointing each of the second and third cylinder actuators to the base plate, comprises:
   two first shafts integrally extending outwardly from diametrically opposite portions of each of the second and third cylinder actuators;
   a middle block rotatably supporting said two first shafts using bearings and having two second shafts, said second shafts integrally extending outwardly from diametrically opposite portions of the middle block in a way such that the second shafts are perpendicular to the first shafts; and two outside blocks fixedly mounted to the top of said two fixed blocks and rotatably supporting the second shafts of the middle block using bearings.

8. The motion base device according to claim 1, further comprising height sensing means for sensing a vertical displacement of each of said first to third cylinder actuators.

9. The motion base device according to claim 1, wherein said hydraulic pressure supply unit comprises:

an oil tank;

an oil pump used for pressurizing oil of said oil tank so as to supply pressurized oil to the first to third cylinder actuators; and directional control valve means provided on fluid lines extending between said oil pump and said first to third cylinder actuators, thus controlling pressurized oil passing through the fluid lines.

10. The motion base device according to claim 9, wherein said directional control valve means comprises three electronic 4-port/3-position servo valves respectively provided on the fluid lines extending between said oil pump and said first to third cylinder actuators.

* * * * *